United States Patent [19]

Dion et al.

[11] 4,361,242
[45] Nov. 30, 1982

[54] SUPPORTING CHASSIS FOR A WORKING MACHINE SUCH AS A MECHANICAL SHOVEL

[75] Inventors: Daniel J. Dion, Saint Pathus; Daniel G. Ranini, Varredes, both of France

[73] Assignee: Poclain, Le Plessis-Belleville, France

[21] Appl. No.: 190,837

[22] Filed: Sep. 25, 1980

[30] Foreign Application Priority Data

Oct. 12, 1979 [FR] France .................. 79 25490

[51] Int. Cl.³ .............................. B66C 23/84
[52] U.S. Cl. ........................ 212/253; 180/9.2 R; 212/181; 212/178; 280/30
[58] Field of Search ............... 280/783, 793, 794, 797, 280/798, 799, 800, 781; 180/6.58, 6.6, 6.7, 9.2 R, 89.13, 327; 212/247, 253, 181, 178; 414/687

[56] References Cited

U.S. PATENT DOCUMENTS

| | | | |
|---|---|---|---|
| 2,144,760 | 1/1939 | Harnischfeger | 212/253 |
| 3,477,746 | 11/1969 | Watson | 212/247 |
| 4,266,679 | 5/1981 | Juergens | 180/9.2 R |

FOREIGN PATENT DOCUMENTS 931748  8/1955  Fed. Rep. of Germany ...... 280/797

Primary Examiner—Trygve M. Blix
Assistant Examiner—Jesus D. Sotelo
Attorney, Agent, or Firm—Mason, Fenwick & Lawrence

[57] ABSTRACT

The invention relates to the chassis of a public works machine, constituted by a central frame joined with two side-members.

After assembly with the two side-members, the central frame constitutes a girder comprising a lower plate, an upper plate, two cross-plates, and two longitudinal plates, which plates are joined together as follows:
each cross-plate to the upper plate, to the lower plate and to each one of the longitudinal plates,
and the upper plate and the lower plate to the longitudinal plates, so as to constitute a closed compartment.

The invention finds an application in the construction of a chassis for a mechanical shovel.

5 Claims, 7 Drawing Figures

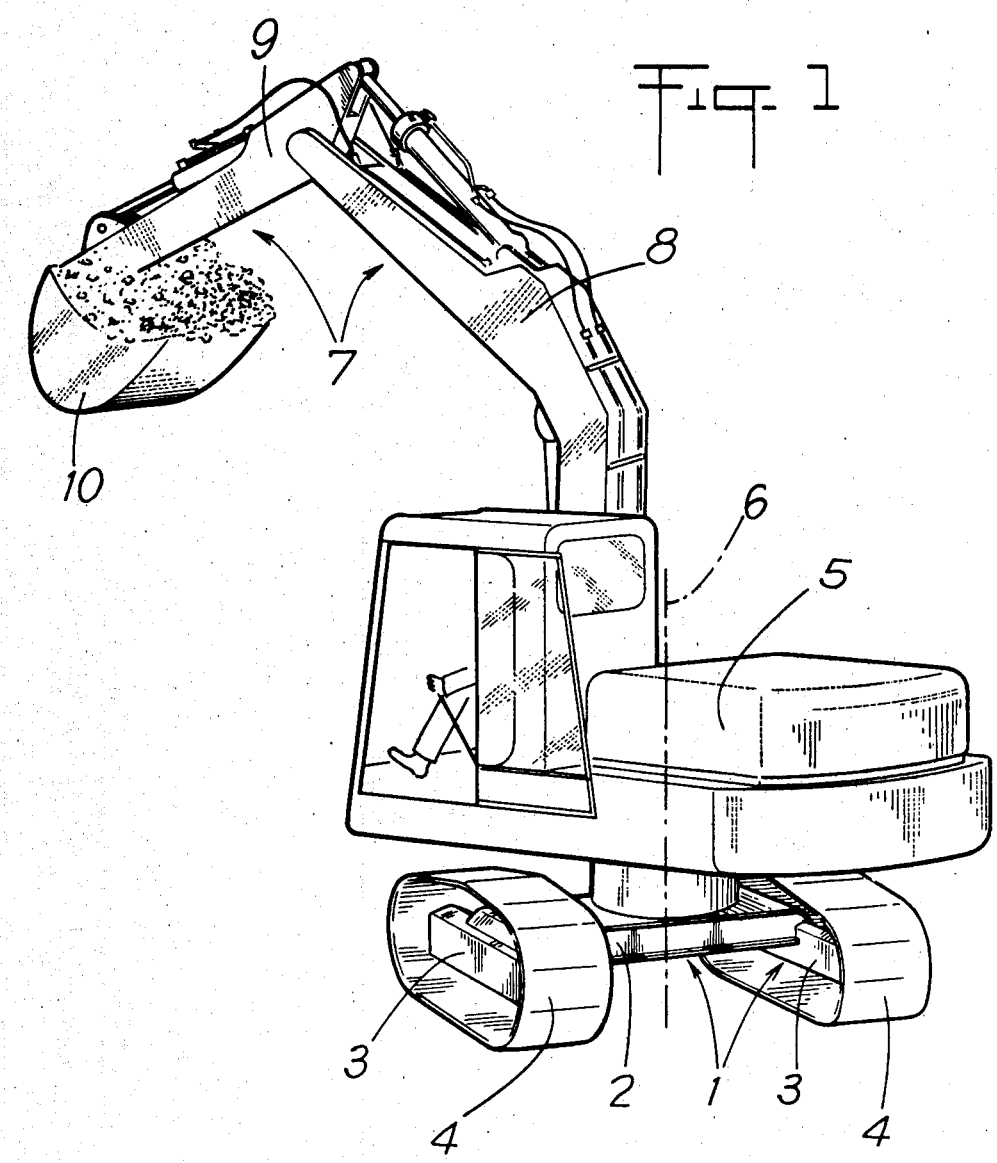

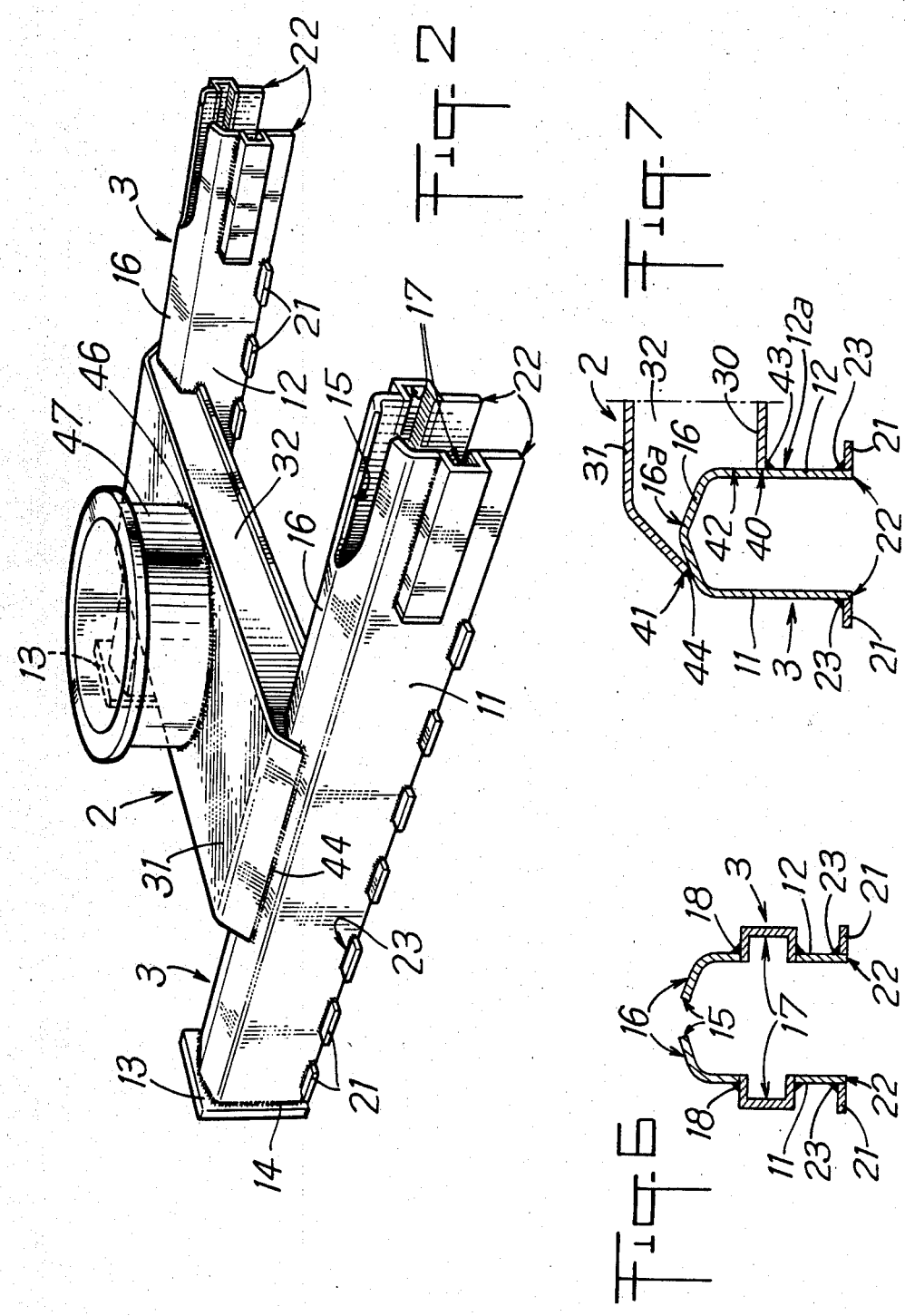

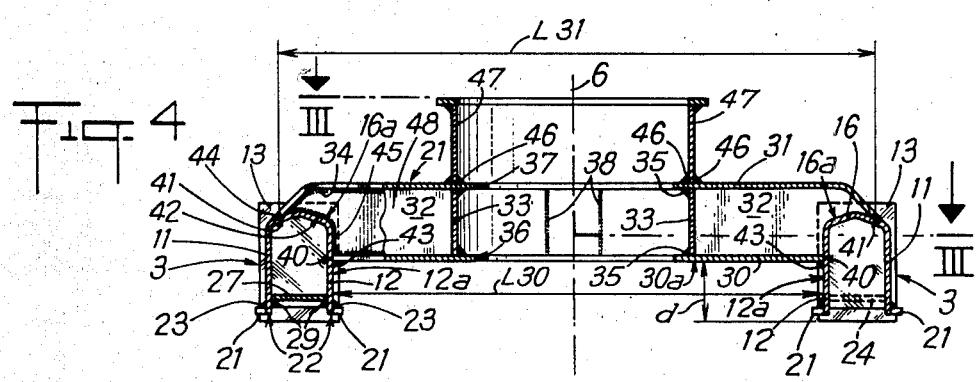
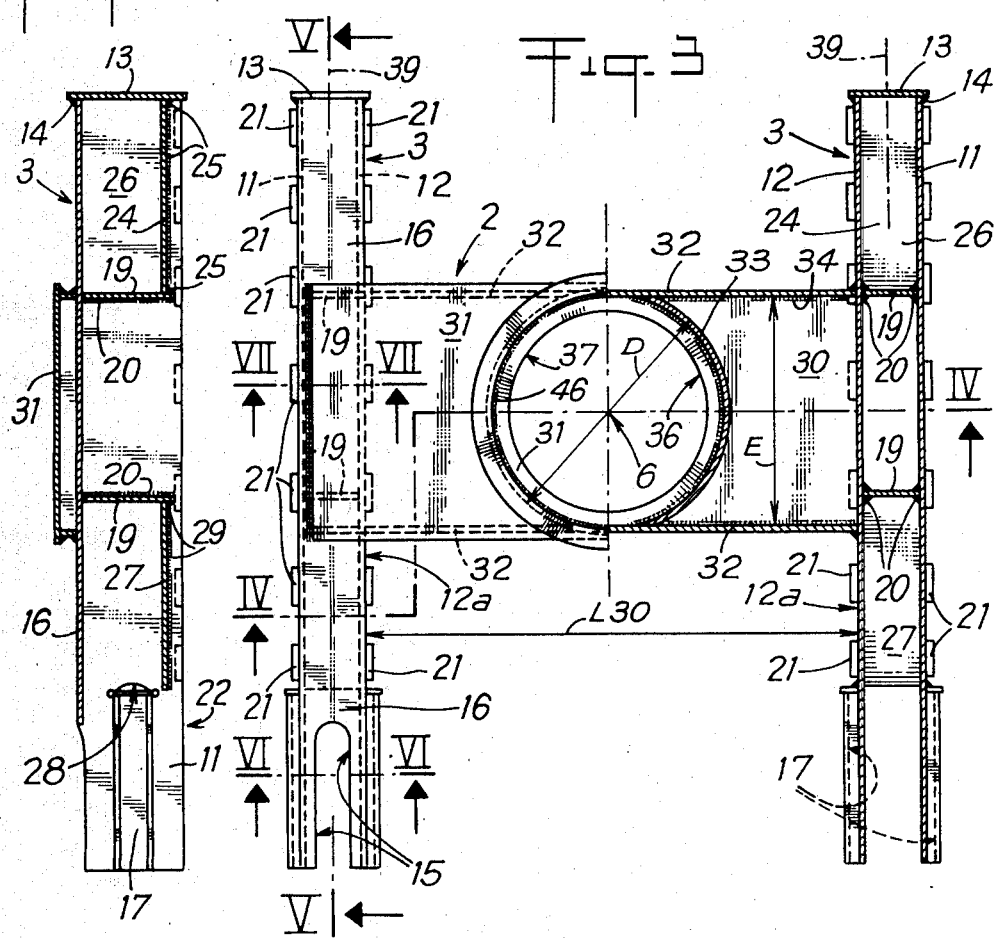

SUPPORTING CHASSIS FOR A WORKING MACHINE SUCH AS A MECHANICAL SHOVEL

The invention relates to a supporting chassis for a working machine such as a mechanical shovel.

A large number of working machines are already known in the field of public works, whose supporting chassis or sub-frame is constituted by a central frame presenting two longitudinal side-members.

All these different elements need to be constructed in such a way as to show great mechanical strength, the chassis having to bear all the reaction stresses which occur between it and the ground.

In the known constructions, the central frame and its connection with the side members are the weak points of existing structures.

It is the object of the invention to eliminate these weak points by proposing a supporting chassis for a working machine such as a hydraulic shovel, which is constituted by a central frame coupled with two longitudinal side-members.

When assembled with the two-side-members, the central frame constitutes a girder which comprises:
a substantially horizontal external lower plate,
a substantially horizontal external upper plate,
two substantially vertical external cross-plates, and
in the area of the side-members, two external longitudinal plates, these various plates being joined together as follows:
each external cross-plate to the upper plate, to the lower plate, and to each one of the longitudinal plates,
and in addition, the upper plate and the lower plate are individually joined to each one of the external longitudinal plates,
so as to constitute at least a closed compartment, delimited on the one hand, by the external upper and lower plates, and on the other hand by the two external cross-plates.

The following advantageous arrangements are also preferably adopted:
the external longitudinal plates of the central frame are constituted by the side-members proper;
the machine comprising an upper-structure or turret mounted on the central frame for rotation with respect to the chassis, about a substantially vertical axis, by means of a shroud integral with the said central frame, the said shroud being mounted on a shroud support constituted by a sheet of metal extending between the external lower and upper plates of the central frame and which is connected to said plates;
the shroud support has a longitudinal dimension which is equal to the distance separating the external cross-plates from the central frame and is fitted to each one of the said external cross-plates so as to constitute at least two closed side-compartments, each one of which is situated on the side of the shroud support which is opposite the vertical axis of said shroud support and each one being defined by the external upper and lower plates of the central frame, and, by one of the two external longitudinal plates of the central frame, and by the said shroud support;
each side-member being delimited by two substantially vertical longitudinal side-member plates, fitted to an upper side-member plate, the external upper plate of the central frame has a transversal dimension greater than the transversal dimension of the external lower plate of the said central frame, whereas the external lower plate of the central frame has its longitudinal edges adjacent the internal longitudinal plates of the side-members, and whereas the external upper plate and the central frame, cover, at least partly, the upper plate of each side-member;
each longitudinal edge of the external lower plate of the central frame, as well as each longitudinal edge of the external upper plate of the said central frame are welded to the side-members to which they are connected;
the two adjacent edges of the said plates or metal sheets are assembled together by way of a sealing weld bead.
the closed compartments are sealed;
each side-member is essentially constituted by a metal sheet folded so as to have a U-shaped cross-section, the vertical branches of the U constituting the cross-sections of the longitudinal plates of the side-member, and, the branch joining up the vertical branches of the U constituting the cross-section of the upper plate of said side-member.

The invention will be more readily understood on reading the following description with reference to the accompanying drawings, in which:

FIG. 1 is a perspective view of a hydraulic shovel comprising the chassis according to the invention;

FIG. 2 is a perspective view of the chassis of the shovel shown in FIG. 1;

FIG. 3 is a cross-section along III—III of FIG. 4, of the chassis of FIG. 2;

FIG. 4 is a cross-section along IV—IV of FIG. 3;

FIG. 5 is a cross-section along V—V of FIG. 3;

FIGS. 6 and 7 are cross-sections along VI—VI and VII—VII respectively of FIG. 3.

FIG. 1 shows a mechanical shovel comprising a supporting chassis 1 according to the invention. According to a conventional arrangement, the said supporting chassis is constituted by a central frame 2 joined with two side-members 3. Said latter supports the members ensuring the displacement of the machine, which in the illustrated example are constituted by caterpillar tracks 4. A turret 5 is mounted on the central frame 2, for pivoting about a vertical axis 6. The working equipment 7 of the machine is coupled to the turret 5 and consists, also in known manner, of a boom 8, a dipper-arm 9 and an excavating bucket 10.

Each side-member 3 is constituted by a folded metal sheet, forming an overturned U and thus comprising two flanks joined together by an upper plate 16. Said flanks are parallel, extend, lengthwise, horizontally, and are contained in vertical planes: they are the external flank 11 and the internal flank 12. A vertical cross-plate 13 is welded (14) to the edges of one of the ends of the flanks and of the upper plate of each side-member.

A longitudinal opening 15 is provided in the upper plate 16 on the other end part and allows the fitting of a tension wheel of the driving chain of the caterpillar track 4 supported by the corresponding side-member. Horizontal slides 17 are also secured by welding (18) to the external 11 and internal 12 flanks in the other end part, and extend longitudinally, which slides make it possible for the axis of rotation of the said tension wheel to be fitted for sliding with respect to the side-member.

Also to be noted is the presence of two vertical cross-plates 19, contained inside the U of each side-member, whose cross-section assumes exactly that of the said U, said vertical cross-plates being welded (20) to the said side-member, thereby forming a gusset to re-inforce the side-member.

Small gussets 21 are placed horizontally in pairs at regular intervals, along the lower edges 22 of the external 11 and internal 12 flanks and are welded (23) to said flanks, thereby constituting the mounting elements of the supporting rollers of the caterpillar tracks 4.

Finally, a horizontal plate 24 is placed at the lower part of the end of each side-member defined by the cross-plate 13, and extends between said plate 13 and the nearest cross-plate 19, over about a quarter of the length of the side-member, said horizontal plate 24 being welded (25) to the said metal sheets 13 and 19, and to the flanks 11 and 12, thereby contributing to creating a closed end-compartment of the side-member. Another horizontal plate 27 is also arranged at the lower part of each side member, and extends over about one quarter of the length of the side-member, towards the other end thereof, starting from the other cross-plate 19, up to approximately level with the bottom 28 of the slides 17. Said plate is welded (29) to said other plate 19 and to the flanks 11 and 12. Both plates 24 and 27 cooperate of course to creating a side-member with an adequate mechanical strength.

The central frame 2 is more particularly constituted by lower and upper horizontal plates 30 and 31, by two vertical cross-plates 32, which are parallel, and by two semi-cylindrical plates 33 arranged vertically. The cross-plates 32 extend between the lower plate 30 and the upper plate 31 to which they are welded (34). Likewise, the semi-cylindrical plates 33 extend between the lower plate 30 and the upper plate 31 and are welded thereto (35). They constitute both together a substantially cylindrical shroud support, co-axial to the axis 6 and surrounding holes 36 and 37 provided in the central portions of the lower plate 30 and of the upper plate 31. Finally, it should be noted that the vertical edges of the semi-cylindrical plates 33 are welded (38) to the cross-plates 32 with which they contact, the distance E between the cross-plates 32 being only just smaller than the diameter D of the semi-cylindrical plates 33.

The transversal dimension L30 of the lower plate 30, measured at right angle to the parallel longitudinal axes 39 of the two side-members 3 is smaller than the corresponding dimension across L31 of the upper plate 31. The dimension L30 is, in effect, equal to the distance between the external face 12a of the internal flanks 12 of the two side-members. Thus, due to this difference in the transversal dimensions (L30<L31), the central frame 2 can be, and is, joined to the side-members, 3, by bringing the following elements closer together until they contact:

the horizontal longitudinal edges 40 of the lower plate 30 and the external faces 12a of the internal flanks 12 of the side-members,
the horizontal longitudinal edges 41 of the upper plate 31 and the upper external faces 16a of the upper plate 16 of the side-members,
the edges 42 of the ends of the cross-plates 32 of the central frame and the said face 12a and 16a, and by welding said edges and faces together:
welding 43 of the edges 40 of the lower plate 30,
welding 44 of edges 41 of the upper plate 31,
welding 45 of the edges 42 of the cross-plates 32.

Another fact to be noted is that the central frame is completed by the positioning and welding (46), above the semi-cylindrical plates 33, of plates 47, identical in shape and extending them to constitute the support proper of the runner ring which pivotally connects the turret 5 on the chassis 1, about the axis 6.

The advantages of the proposed construction will now be explained.

First of all, the central frame 2 is a very strong structure although relatively light. It is to be noted on this point that the different assemblies lead to the formation of two compartments 48, which are entirely closed and empty, and in addition sealed off by the spreading of the welding. Each compartment 48 is situated on either side of the shroud support formed by the semi-cylindrical plates 33, and is delimited by the lower plate 31, the upper plate 30 and the cross-plates 32, as well as by a semi-cylindrical plate 33 and the U-shaped plate constituting the corresponding side-member. Moreover, the compartment being empty, its weight is relatively light.

It is to be noted that the shroud support, constituted by the semi-cylindrical plates 33 forms an integral part of the compartment structure and is not just laid on to the compartment, where it would obviously not contribute to giving it its mechanical strength.

Furthermore, the central frame 2 is made fast with the side-members 3 mainly by way of two elongated weldings 43 and 44 extending over the whole length of the frame 2. Thus, the external stresses transmitted from a side-member 3 to the frame 2 or vice-versa, can traverse a very large stationary area, which eliminates all risks of the chassis breaking where the side-members and the central frame are joined together.

Also, due to the differences existing between the transversal dimensions of the lower plate 30 and the upper plate 31 of the central frame, the upper plate 31 covers part of each side-member, whereas the lower face 30a of the lower plate 30 is raised by a distance d with respect to the lower level of each side-member 3. An advantageous "ground clearance" is thus obtained for the central frame.

Finally to be noted is the simple construction of the side-member 3 from an overturned U-shaped plate.

The invention is not restricted to the embodiment described hereinabove, but on the contrary, covers any variant that can be made thereto without departing from its scope or its spirit.

What is claimed is:

1. Supporting chassis for a public works machine, such as a hydraulic shovel, consisting of a central frame joined with two side-members, wherein after assembly with the said side members, said central frame constitutes a girder comprising:

a substantially horizontal external lower plate,
a substantially horizontal external upper plate,
two substantially vertical external crossplates, and
in the area of the side-members, two external longitudinal plates, these various plates being joined together as follows:
each external cross-plate to the upper plate, to the lower plate, and to each one of the longitudinal plates,
and in addition, the upper plate and the lower plate are individually joined to each one of the external longitudinal plates,
so as to constitute at least a closed compartment, delimited on the one hand, by the external upper and lower plates, and on the other hand by the two external crossplates, an upper-structure or turret mounted on the central frame for rotation with respect to the chassis, about a substantially vertical axis, by means of a shroud integral with the said central frame, the said shroud being mounted on a shroud support constituted by a sheet of metal extending between the external lower and upper plates of the central frame and which is connected to said plates.

2. The supporting chassis of claim 1, wherein the shroud support has a longitudinal dimension which is equal to the distance separating the external cross-plates from the central frame and is fitted to each one of the said external cross-plates so as to constitute at least two closed side-compartments, each one of which is situated on the side of the shroud support which is opposite the vertical axis of said shroud support and each one being defined by the external upper and lower plates of the central frame, and, by one of the two external longitudinal plates of the central frame, and by the said shroud support.

3. The supporting chassis of any one of claims 1 or 2, wherein each side-member is delimited by two substantially vertical longitudinal side-member plates, fitted to an upper side-member plate, the external upper plate of the central frame has a transversal dimension greater than the transversal dimension of the external lower plates of the central frame, whereas the external lower plate of the central frame has its longitudinal edges adjacent the internal longitudinal plates of the side-members, and whereas the external upper plate of the central frame, covers, at least partly, the upper plate of each side-member.

4. The supporting chassis of claim 3, wherein each side-member is essentially constituted by a metal sheet folded so as to have a U-shaped cross-section, the vertical branches of the U constituting the cross-section of the longitudinal plates of the side-member, and, the branch joining up the vertical branches of the U constituting the cross-section of the upper plates of said side-member.

5. The supporting chassis of claim 1, wherein the two adjacent edges of the said plates and said sheet of metal are assembled together by way of a sealing weld bead.

* * * * *